Patented July 6, 1937

2,086,216

UNITED STATES PATENT OFFICE 2,086,216

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application December 24, 1936, Serial No. 117,585

17 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The reagent or demulsifying agent contemplated for use in my present process consists of or comprises a sulfonic acid derivative of an acylated aromatic compound and preferably of the kind in which the acyl group contains at least 8 carbon atoms and not more than 40 carbon atoms. Although such materials may be made in various ways, they are most preferably prepared by sulfonation of an acylated aromatic body.

In my co-pending application for patent, Ser. No. 117,584, filed December 24, 1936, I have described the use of a demulsifying agent consisting of or comprising a sulfonic acid derivative of an alkylated aromatic compound characterized by the fact that the alkyl group or radical is substituted in place of a nuclear hydrogen atom and contains more than 12 carbon atoms and not more than 30 carbon atoms. The preparation of such alkylated aromatic materials may be conducted in the manner described in U. S. Patent #2,061,593, dated November 24, 1936, to Robinson. The procedure there described is particularly desirable because the long chain alkyl radicals are derived from naturally-occurring waxes or the like, at a relatively low cost. However, such reaction results in the production of a substantially large amount of an acylated aromatic material as well as an alkylated aromatic material. The process will be illustrated by the following examples which are substantially identical with the manner in which they appear in the aforementioned Robinson patent.

Example 1

2 parts of spermaceti, 1 part of phenol, and 1 part of zinc chloride are agitated and heated under a reflux condenser at approximately 185° for about 16 hours. The mixture is diluted with water, and the oily portion is separated and washed first with dilute hydrochloric acid and then with water until reasonably free from water-soluble products. The resulting oil is fractionally distilled in vacuo. The fraction boiling from 230° to 260° at 13 mm. is collected separately. This particular fraction consists chiefly of cetyl phenol. The remainder of the material consists largely of palmityl phenol.

Example 2

200 parts of spermaceti and 50 parts of phenol are mixed thoroughly, and to this mixture 80 parts of aluminum chloride (anhydrous) are added in small portions so that the temperature of the reaction mass does not exceed 100°. The mixture is held at about 100° for about one hour after the last addition of aluminum chloride. Thereafter, the temperature is raised to 150° to 175° and held there over a period of about 2 hours. The mixture is then heated rapidly to about 225°, held there for 20 minutes, cooled and diluted with water. The oil is separated, washed with dilute hydrochloric acid and water till reasonably free from water-soluble products, and then vacuum distilled. The fraction boiling from 230° to 265° at 13 mm. pressure is collected. This particular fraction consists of cetyl phenol. The remainder of the material consists largely of palmityl phenol.

Example 3

300 parts of spermaceti, 150 parts phenol, 75 parts zinc chloride, and 12 parts of concentrated hydrochloric acid are mixed and heated to boiling under a reflux condenser for 18 hours. The mixture is then diluted with water and the oily portion is washed with water till practically free from water-soluble impurities. The resulting oil is fractionally distilled in vacuo. The fraction boiling from 230° to 265° at 13 mm. is collected. This particular fraction consists chiefly of cetyl phenol. The remainder of the material consists largely of palmityl phenol.

Example 4

A mixture of 200 parts of carnauba wax, 100 parts of phenol and 100 parts of zinc chloride is heated under a reflux condenser at about 180° for approximately 18 hours. The condensation mass is diluted with water, and 100 parts of benzene which acts as a flux. The oily mass is washed with water until reasonably free from water-soluble products. The oil remaining is distilled in vacuo. The fraction boiling from 290° to 320° at 5 mm. pressure is collected. This particular fraction is a yellow wax-like solid, comprising chiefly ceryl phenol. The remainder of the material consists largely of palmityl phenol.

The reactions may be illustrated by the following example involving 2 molecules of phenol and 1 molecule of cetyl palmitate.

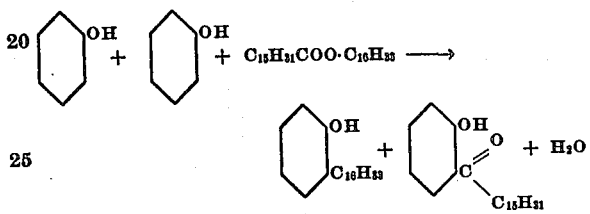

I have found that if an aromatic material be treated under the same conditions previously described with a monocarboxy acid and particularly such as have at least 8 carbon atoms and not more than 40 carbon atoms, one may obtain an acylated aromatic material without the formation of an alkylated material. Such reaction may be indicated by the following example.

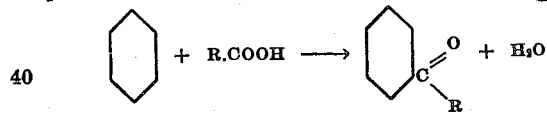

It is also understood that such acylated compounds may be prepared from aromatic materials by use of an acyl halide, for instance the acyl chloride, provided that the aromatic material does not contain a hydroxyl radical. Such example may be illustrated as follows:

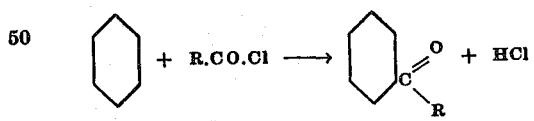

It is understood that it is immaterial as to the particular procedure employed in the manufacture of the acylated aromatic material or of the sulfonated acylated aromatic material. It may be possible to sulfonate the aromatic material prior to acylation. For instance, in the first example above, in which the reaction between 2 moles of phenol and 1 mole of cetyl palmitate is illustrated, one might use 2 moles of phenol sulfonic acid instead of the phenol. One may prepare poly-acylated aromatic compounds as well as mono-acylated ones. The poly-acylated compounds, such as di-acylated compounds, may be sulfonated in the usual manner.

It is to be noted that the aforementioned Robinson patent is concerned only with the method of preparing acylated derivatives of aromatic compounds as a side reaction and not the sulfo derivatives thereof. However, the sulfo derivatives of acylated aromatic compounds derived in any suitable manner, are obtainable by the conventional sulfonation process of the same kind as employed in the manufacture of sulfonic derivatives of alkylated aromatic compounds. This is the general procedure employed, for example, in producing sulfonated propyl naphthalene, sulfonated dipropyl naphthalene, sulfonated tripropyl naphthalene, sulfonated tetrapropyl naphthalene, sulfonated cresol, cymene sulfonic acid, toluene sulfonic acid, methyl naphthalene sulfonic acid, etc. In other words, the acylated aromatic compounds are sulfonated in the same manner as the alkylated aromatic compounds and, in the event that one is sulfonating a mixture of the two types, the same sulfonation procedure is employed. Under certain circumstances hereinafter described it may be desirable to follow procedures which involve both sulfonation and sulfation, or sulfation alone. It is also understood that the acylated aromatic compound may also be alkylated in the nuclear position, for example, cresol or methyl naphthol may replace phenol in the previous examples. Similarly sulfonation may take place in presence of propyl hydrogen sulfate, butyl hydrogen sulfate, etc. so as to introduce propyl or butyl groups or the like into the aromatic nucleus during the sulfonation process. It may even be possible to conduct reactions of the kind previously described under conditions involving use of 1 mole of phenol, for example, 1 mole of cetyl palmitate, so as to yield an acylated and alkylated derivative. Sulfonation is usually obtained by the action of sulfuric acid or by action of what is known as a strong sulfonating agent and may, of course, yield polysulfonic acids (disulfonic and trisulfonic acid) as well as monosulfonic acids.

By the expression "strong sulfonating agents" is meant sulfonating agents of greater sulfonating power than 100% sulfuric acid. Included among such sulfonating agents are compounds which per se have a greater sulfonating power than 100% sulfuric acid such as for example, sulfur trioxide, chlorsulfonic acid, bromsulfonic acid, oleum and acetyl sulfuric acid. In practice, it is preferable to employ this class of sulfonating agents, and especially desirable results have been obtained with chlorsulfonic acid. Where sulfur trioxide is employed, it may be introduced into the reaction mixture either in gaseous, liquid or solid form. As examples of other strong sulfonating agents may be mentioned milder sulfonating agents, such as sulfuric acid in combination with reagents capable of removing water from the reaction mass, such as, for example, acetyl chloride, glacial acetic acid, acetic anhydride, propionic acid, propionic anhydride, phosphorous pentoxide, phosphorous oxychloride and boric anhydride. If desired, dehydrating agents may be employed in connection with the sulfonating agents which in themselves are strongly sulfonating, viz. sulfur trioxide, chlorsulfonic acid, oleum and the like, but there appears to be very little added advantage in such a procedure.

Sulfonation is customarily followed by a washing process in which the sulfonated mass is mixed with water or some aqueous medium, such as a solution of sodium sulfate or the like, mixed thoroughly, and then permitted to separate. After separation the acidic waste-water is withdrawn and the acid mass is employed as such or after conversion into salts or esters as hereinafter described in greater detail.

The production of relatively long chain nuclear alkyl derivatives of aromatic compounds as described in the said aforementioned Robinson patent, relates to the use of raw materials, such as spermaceti, wool wax, beeswax, carnauba wax, Arctic sperm oil, flax wax, palm wax, Chinese wax, etc. Spermaceti consists of cetyl palmitate. Wool wax contains ceryl and melissyl myristate; beeswax contains myricyl palmitate; carnauba wax is chiefly myricyl melissate; Arctic sperm oil contains lauryl oleate; flax wax contains ceryl palmitate; palm wax contains melissyl melissate; and Chinese wax is mostly ceryl cerotate. Similar synthetic waxes or esters obtained by combining alcohols derived synthetically, such as octadecyl alcohol, stearyl alcohol, oleyl alcohol, ricinoleyl alcohol, naphthenyl alcohols, with suitable fatty acids, such as oleic acid, stearic acid, palmitic acid, etc. may be employed instead of the naturally-occurring waxes.

In preparing certain demulsifying agents, my preference is to prepare palmityl phenol in the manner described in Examples 1, 2 or 3 by conducting the reaction in the manner described above by employing in all instances at least as much phenol by weight as spermaceti. Spermaceti is employed as a crude form of cetyl palmitate. As pointed out previously, the alkylated aromatic materials which are formed along with the acylated aromatic materials yield acceptable demulsifying agents after sulfonation. Therefore, from a practical standpoint, I prefer to subject the mixture of acylated and alkylated aromatic materials (and possibly some materials in which the acyl and alkyl radicals are introduced into the same nucleus) to sulfonation and subsequent treatment without separation.

It may be well to point out that while the above examples, which are concerned with the preparation of the derivatives prior to sulfonation, employ phenol with the aid of zinc chloride or aluminum chloride as condensing agents, it is to be noted that numerous variations are applicable. Similarly, non-hydroxy materials, such as benzene, toluene, cymene, naphthalene, methyl naphthalene, and their derivatives may be alkylated. Such derivatives may contain halogen atoms, alkyl radicals, alkoxy radicals, carboxy radicals, and other radicals as nuclear substituents. One may employ polycyclic phenols, such as alpha or beta naphthol or naphthols derived from methyl naphthalene and the like. Desirable demulsifying agents which are readily prepared are those derived from the monohydric phenols, such as ordinary phenol (hydroxy benzene), various cresols, xylenols, etc.

Various other condensing agents for production of the acylated aromatic bodies, in addition to zinc chloride, aluminum chloride, etc. may be employed, such as ferric chloride, stannic chloride, titanium chloride, etc. or a mixture of 2 or more of the various condensing agents may be employed. It is often desirable to have present a small amount of acid, such as hydrochloric acid, in addition to the metallic halide condensing agent.

If the materials prior to sulfonation are obtained in the manner described in the Robinson patent then, of course, one may resort to fractional distillation in vacuo to separate the alkylated materials from the acylated materials and thus obtain an acylated aromatic material substantially free from other impurities. For the reason previously indicated, this is not necessary and generally represents an unnecessary expense.

I have found that the most desirable reagents are obtainable from the type of acylated aromatic material of the kind in which the acyl group is also susceptible to sulfation. It is well known that a large number of hydroxylated or unsaturated, or hydroxylated and unsaturated fatty materials, such as oleic acid, linoleic acid, hydroxystearic acid, ricinoleic acid, diricinoleic acid, stearyl ricinoleic acid, oleyl ricinoleic acid, and the like, may be subjected to sulfation so as to yield an organic acid sulfate, as in the case of the manufacture of Turkey red oils. In some instances the products obtained in the ordinary sulfation of fatty materials may be in the form of esters and the sulfation may be directed to esters instead of the fatty acids as, for example, in the sulfation of castor oil.

If one conducts reactions of the kind previously described and employs some synthetic waxes or esters obtained by combining alcohols derived synthetically, such as octyl alcohol, decyl alcohol, octadecyl alcohol, etc. with hydroxystearic acid, ricinoleic acid, oleic acid, erucic acid, diricinoleic acid, stearyl ricinoleic acid, oleyl ricinoleic acid, and the like, one introduces into the aromatic nucleus an acyl radical which is susceptible to sulfation. Similarly, oleyl chloride, ricinoleyl chloride, hydroxystearyl bromide, etc. may be reacted with a non-hydroxy aromatic material of the kind previously described. Condensation reactions may also be conducted involving an aromatic material and ricinoleic acid, hydroxystearic acid, oleic acid, and the like, so as to cause acylation. It is understood, of course, that such alteration or modification that still permits sulfation is not objectionable. For instance, ricinoleic acid dichloride might be used in place of ricinoleic acid because there is still available a hydroxyl radical which is susceptible to sulfation. Similarly, linoleic acid dichloride may be employed because there would still be available an ethylene linkage susceptible to sulfation. It is understood that such modifications are obvious chemical equivalents and that such modified acyl groups are the obvious chemical equivalents of the unmodified acyl groups, provided that the residue is still susceptible to sulfation.

My preferred reagent is prepared from ricinoleyl phenol by subjecting the material to sulfation in such a manner that the ricinoleyl radical becomes sulfated without sulfonation of the phenol residue. After sulfation of such material in the manner customarily employed in the manufacture of Turkey red oil, the acidic mass is washed and separated in the usual manner. The separated acidic mass is neutralized by means of any suitable base, such as caustic soda, ammonium hydroxide, but preferably with such material as triethanolamine. This particular reagent represents my preferred type of reagent. However, if desired, ricinoleyl phenol may be sulfonated in such a manner as to introduce a sulfate group into the ricinoleyl radical, and also a sulfonic group into the aromatic nucleus. Such product is then washed and separated as previously described and neutralized so that both the acid sulfate acidic hydrogen atom and the sulfonic acidic hydrogen atom are neutralized.

If desired, one may modify the previous procedure in the following manner: After the completion of the sulfation and sulfonation processes, the acidic mass may be boiled with water in the acid state so as to hydrolyze the acid sulfate radical which has been introduced. The sulfonic radical introduced in the aromatic nucleus is not affected significantly by such hydrolysis. After completion of hydrolysis, separation is conducted as before and the acidic mass neutralized. In such instances it is to be noted that there is no acid sulfate radical present and there is present one or more sulfonic radicals in the aromatic nucleus. Such material, of course, is entirely comparable to the material obtained by the sulfation of acylated material of the kind in which the acyl radical is not susceptible to sulfation.

I will employ the expression "sulfo" to indicate the introduction of either one or more sulfonic radicals or one or more acid sulfate radicals or both, without distinction as to the particular form in which the oxygenated sulfur radical is introduced. Specific reference to acid sulfate radicals will be apparent from the text or by the use of the expression "sulfated". Specific reference to sulfonic acid radicals will be apparent from the text or will be indicated by the use of the expression "sulfonated".

It is understood that these materials are characterized by the presence of a sulfo acid radical, and may be in the form of the free acid itself or the salt or ester. For instance, in the procedure outlined above the products are first manufactured as acids, and then neutralized. Such sulfo acid may be used as a demulsifying agent in the present process for breaking petroleum emulsions. However, due to the corrosive properties of such acidic material, it is more desirable to convert the material into a salt or ester. Esterification of such sulfo acids, and particularly of sulfonic acids is rather expensive because it is generally necessary to convert the sulfonic acid into a sulfonchloride and react the sulfonchloride with a suitable alcohol. From a practical standpoint it is most desirable, therefore, to use these materials in the form of a salt. Sulfo acids of the kind described may be reacted with any suitable base, such as caustic soda, caustic potash, ammonium hydroxide, or the like, so as to convert the materials into the corresponding salts. Similarly, instead of ammonia, one may use triethanolamine, diethanolamine, benzylamine, cyclohexylamine, monoamylamine, diamylamine, triamylamine, or any other suitable amine. Sulfo acids of the kind described above may be reacted with calcium oxide, magnesium oxide, and the like. Similarly, one may produce heavy metal salts, such as copper salts, iron salts, lead salts, etc. The heavy metal salts and higher molecular weight amine salts are often oil-soluble. In some instances the higher molecular weight amine salts may be oil and water soluble. My preferred demulsifying agent is obtained by use of an amine, including alkylolamines, such as triethanolamine, to produce a water-soluble salt. As previously stated, one may convert the sulfo acids into suitable esters derived from alcohol, such as methyl alcohol, ethyl alcohol, propyl alcohol, butyl alcohol, amyl alcohol, hexyl alcohol, benzyl acohol, cyclohexanol, etc. It is understood, of course, that the process is not limited to any particular way of manufacturing chemical compounds employed, but that such chemical compounds may be made in any suitable manner without limitation.

For sake of convenience, the ammonium radical and substituted ammonium radicals are considered as the equivalent of metallic atoms, and the expression "metallic atom equivalent" is intended to include the metallic atoms themselves or the ammonium or substituted ammonium radicals.

Moreover, said chemical compound may be used alone or in admixture with other suitable well known classes of demulsifying agents, such as demulsifying agents of the modified fatty acid type, the petroleum sulfonate type, the ordinary alkylated sulfo-aromatic type, etc.

Attention is directed to the fact that the expressions "acyl" and "acylated" are herein employed in the usual manner to refer to the introduction of a group or groups derived from carboxy acids, and more particularly, monocarboxy acids. Sometimes the expressions "acyl" or "acylated" are employed in conjunction with a group or radical derived by dehydroxylation of an acid other than a carboxy acid, for instance, the residue obtained by eliminating a hydroxyl or hydroxyls from sulfuric acid, or the like. It is understood that acylation in reference to the introduction of a residue derived from acids other than carboxy acids is not herein contemplated.

Acylation of an aromatic material, of course, may take place in a manner to involve a linkage other than a carbon atom to carbon atom bond as, for example, in the acylation of a primary aromatic amine in a manner to form a secondary acylated aromatic amine. Thus the compounds herein described as demulsifying agents are characterized by the fact that the acyl group replaces a nuclear hydrogen atom, that is, the linkage is carbon atom to carbon atom.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

In practicing my process a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

It is understood that the use of this process is not limited to any particular isomeric form of the chemical compound or compounds disclosed, but that one isomeric form is as suitable as another.

In the claims the expression "sulfo acylated aromatic body" is employed to refer to materials of the kind previously described without limitation as to the particular form of the acidic hydrogen atom or atoms. Thus, the expression contemplates the materials in the form of acids, salts, or esters without differentiation.

Having thus described my invention, what I claim as new and desire to secure by Letters Patent is:

1. A process for breaking petroleum emulsions of the water-in-oil type, which consists in subjecting the emulsion to the action of a demulsifying agent comprising a chemical compound of the formula type:

$$[(B)_m.T.(D)_n].[X.Z]_p$$

in which B represents a substituent atom or radical introduced into the aromatic nucleus, T is an aromatic residue, D is an acyl radical having not more than 40 carbon atoms and nuclearly substituted into T, X represents an acid residue selected from a class consisting of $SO_4$ radicals and $SO_3$ radicals, Z represents an ionizable hydrogen atom equivalent, m represents the numerals 0, 1 or 2, n represents the numerals 1 or 2, and p represents the numerals 1, 2 or 3.

2. A process for breaking petroleum emulsions of the water-in-oil type, which consists in subjecting the emulsion to the action of a demulsifying agent comprising a sulfo acylated aromatic body in which the acyl group contains at least 8 carbon atoms and not more than 40 carbon atoms, and said acyl group is substituted in place of a nuclear hydrogen atom.

3. A process for breaking petroleum emulsions of the water-in-oil type, which consists in subjecting the emulsion to the action of a demulsifying agent comprising a chemical compound of the formula type:

$$[(B)_m.T.(D)_n].[X.Z]_p$$

in which B represents a substituent atom or radical introduced into the aromatic nucleus, T is an aromatic residue, D is an acyl radical having at least 8 carbon atoms and not more than 40 carbon atoms and nuclearly substituted into T, X represents an acid residue selected from a class consisting of $SO_4$ radicals and $SO_3$ radicals, Z represents an ionizable hydrogen atom equivalent, m represents the numerals 0, 1 or 2, n represents the numerals 1 or 2, and p represents the numerals 1, 2 or 3.

4. A process for breaking petroleum emulsions of the water-in-oil type, which consists in subjecting the emulsion to the action of a demulsifying agent comprising a chemical compound of the formula type:

$$[(B)_m.T.(D)_n].[X.Z]_p$$

in which B represents a substituent atom or radical introduced into the aromatic nucleus, T is an aromatic residue, D is an acyl radical having at least 8 and not more than 40 carbon atoms and nuclearly substituted into T, X represents an acid residue selected from a class consisting of $SO_4$ radicals and $SO_3$ radicals, Z represents an ionizable hydrogen atom equivalent, m represents the numerals 1 or 2, n represents the numerals 1 or 2, and p represents the numerals 1, 2 or 3.

5. A process for breaking petroleum emulsions of the water-in-oil type, which consists in subjecting the emulsion to the action of a demulsifying agent comprising a chemical compound of the formula type:

$$[(B)_m.T.(D)].[X.Z]_p$$

in which B represents a substituent atom or radical introduced into the aromatic nucleus, T is an aromatic residue, D is an acyl radical having at least 8 and not more than 40 carbon atoms and nuclearly substituted into T, X represents an acid residue selected from a class consisting of $SO_4$ radicals and $SO_3$ radicals, Z represents an ionizable hydrogen atom equivalent, m represents the numerals 1 or 2, and p represents the numerals 1, 2 or 3.

6. A process for breaking petroleum emulsions of the water-in-oil type, which consists in subjecting the emulsion to the action of a demulsifying agent comprising a chemical compound of the formula type:

$$[(B)_m.T.(D)].[X.Z]_p$$

in which B represents a substituent atom or radical introduced into the aromatic nucleus, T is an aromatic residue, D is an acyl radical having at least 8 and not more than 40 carbon atoms and nuclearly substituted into T and of the kind susceptible to sulfation, X represents an acid residue selected from a class consisting of $SO_4$ radicals and $SO_3$ radicals, Z represents an ionizable hydrogen atom equivalent, m represents the numerals 1 or 2, and p represents the numerals 1, 2 or 3.

7. A process for breaking petroleum emulsions of the water-in-oil type, which consists in subjecting the emulsion to the action of a demulsifying agent comprising a chemical compound of the formula type:

$$[(B)_m.T.(D)].[X.Z]_p$$

in which B represents a substituent atom or radical introduced into the aromatic nucleus, T is a monocyclic aromatic residue, D is an acyl radical having at least 8 and not more than 40 carbon atoms and nuclearly substituted into T and of the kind susceptible to sulfation, X represents an acid residue selected from a class consisting of $SO_4$ radicals and $SO_3$ radicals, Z represents an ionizable hydrogen atom equivalent, m represents the numerals 1 or 2, and p represents the numerals 1, 2 or 3.

8. A process for breaking petroleum emulsions of the water-in-oil type, which consists in subjecting the emulsion to the action of a demulsifying agent comprising a chemical compound of the formula type:

$$[(B).T.(D)].[X.Z]_p$$

in which B represents a substituent atom or radical introduced into the aromatic nucleus, T is a monocyclic aromatic residue, D is an acyl radical having at least 8 and not more than 40 carbon atoms and nuclearly substituted into T and of the kind susceptible to sulfation, X represents an acid residue selected from a class consisting of $SO_4$ radicals and $SO_3$ radicals, Z represents an ionizable hydrogen atom equivalent, and p represents the numerals 1, 2 or 3.

9. A process for breaking petroleum emulsions of the water-in-oil type, which consists in subjecting the emulsion to the action of a demulsifying agent comprising a chemical compound of the formula type:

$$[OH.T.(D)].[X.Z]_p$$

in which T is a monocyclic aromatic residue, D is an acyl radical having at least 8 and not more than 40 carbon atoms and nuclearly substituted into T and of the kind susceptible to sulfation, X represents an acid residue selected from a class consisting of $SO_4$ radicals and $SO_3$ radicals, Z represents an ionizable hydrogen atom equivalent, and p represents the numerals 1, 2 or 3.

10. A process for breaking petroleum emulsions of the water-in-oil type, which consists in subjecting the emulsion to the action of a demulsifying agent comprising a chemical compound of the formula type:

$$[OH.T.(D)] . [X.Z]_p$$

in which T is a monocyclic aromatic residue, D is a ricinoleyl radical nuclearly substituted into T, X represents an acid residue selected from a class consisting of $SO_4$ radicals and $SO_3$ radicals, Z represents an ionizable hydrogen atom equivalent, and $p$ represents the numerals 1, 2 or 3.

11. A process for breaking petroleum emulsions of the water-in-oil type, which consists in subjecting the emulsion to the action of a demulsifying agent comprising a chemical compound of the formula type:

$$[OH.T.(D)] . [X.Z]$$

in which T is a monocyclic aromatic residue, D is a ricinoleyl radical nuclearly substituted into T, X represents an acid residue selected from a class consisting of $SO_4$ radicals and $SO_3$ radicals, and Z represents an ionizable hydrogen atom equivalent.

12. A process for breaking petroleum emulsions of the water-in-oil type, which consists in subjecting the emulsion to the action of a demulsifying agent comprising a chemical compound of the formula type:

$$[OH.T.(D)] . [SO_4.Z]$$

in which T is a monocyclic aromatic residue, D is a ricinoleyl radical nuclearly substituted into T, and Z represents an ionizable hydrogen atom equivalent.

13. A process for breaking petroleum emulsions of the water-in-oil type, which consists in subjecting the emulsion to the action of a demulsifying agent comprising a chemical compound of the formula type:

$$[OH.T.(D)] . [SO_4.Z]$$

in which T is a monocyclic aromatic residue, D is a ricinoleyl radical nuclearly substituted into T, and Z represents an organic radical.

14. A process for breaking petroleum emulsions of the water-in-oil type, which consists in subjecting the emulsion to the action of a demulsifying agent comprising a chemical compound of the formula type:

$$[OH.T.(D)] . [SO_4.Z]$$

in which T is a monocyclic aromatic residue, D is a ricinoleyl radical nuclearly substituted into T, and Z represents a metallic atom equivalent.

15. A process for breaking petroleum emulsions of the water-in-oil type, which consists in subjecting the emulsion to the action of a demulsifying agent comprising a chemical compound of the formula type:

$$[OH.T.(D)] . [SO_4.Z]$$

in which T is a monocyclic aromatic residue, D is a ricinoleyl radical nuclearly substituted into T, and Z represents a substituted ammonium radical.

16. A process for breaking petroleum emulsions of the water-in-oil type, which consists in subjecting the emulsion to the action of a demulsifying agent comprising a chemical compound of the formula type:

$$[OH.T.(D)] . [SO_4.Z]$$

in which T is a monocyclic aromatic residue, D is a ricinoleyl radical nuclearly substituted into T, and Z represents an alkylolamine radical.

17. A process for breaking petroleum emulsions of the water-in-oil type, which consists in subjecting the emulsion to the action of a demulsifying agent comprising a chemical compound of the formula type:

$$[OH.T.(D)] . [SO_4.Z]$$

in which T is a monocyclic aromatic residue, D is a ricinoleyl radical nuclearly substituted into T, and Z represents a triethanolamine radical.

MELVIN DE GROOTE.